April 2, 1935.　　A. L. MILLER ET AL　　1,996,252
BRAKE TRUING DEVICE
Filed June 20, 1932　　2 Sheets-Sheet 2
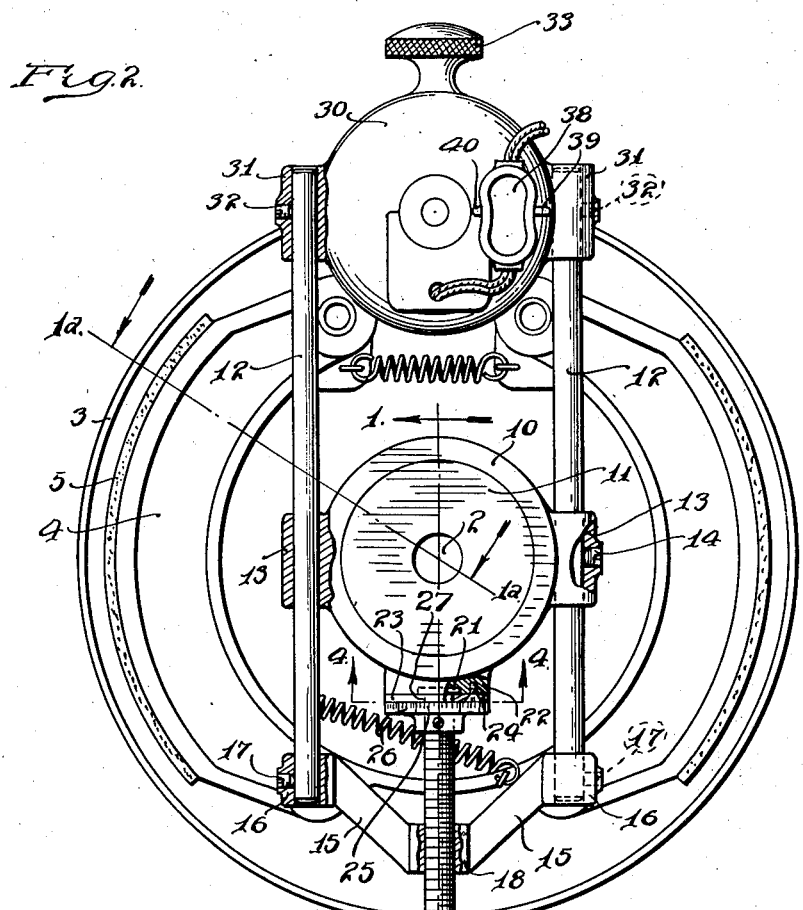
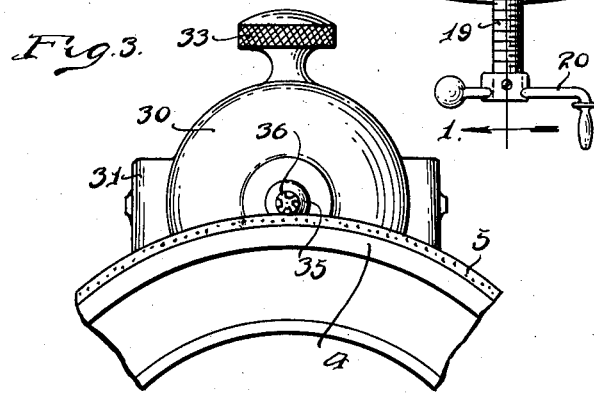
INVENTOR.
ALVIN L. MILLER.
RUSSELL H. MILLER.
BY
Barnes, Kisselle & Laughlin
ATTORNEYS Patented Apr. 2, 1935

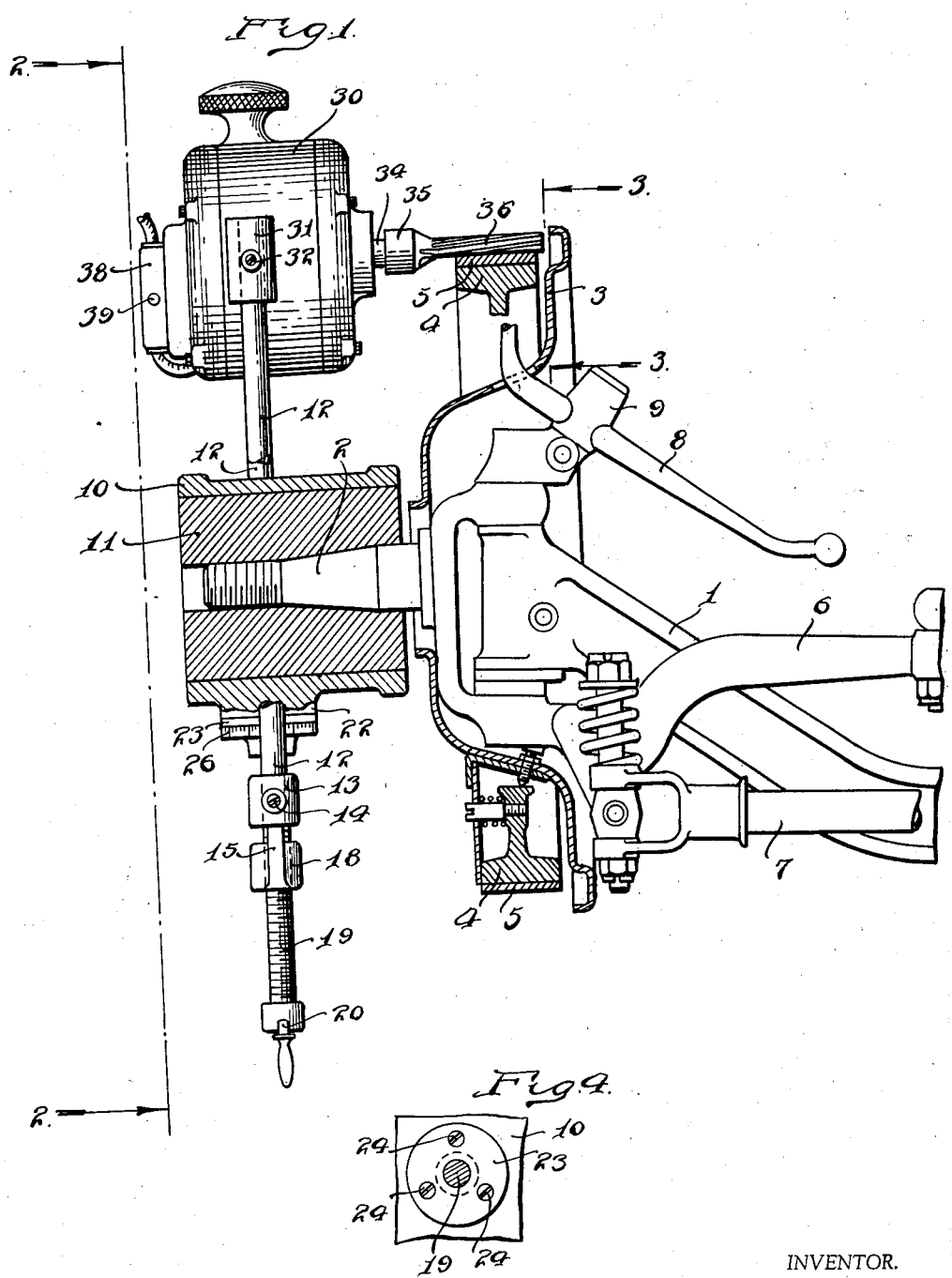

1,996,252

UNITED STATES PATENT OFFICE 1,996,252

BRAKE TRUING DEVICE

Alvin L. Miller and Russell H. Miller,
Detroit, Mich.

Application June 20, 1932, Serial No. 618,115

2 Claims. (Cl. 90—12)

This invention has to do with a truing device for vehicle brakes, and it is concerned particularly with brakes such as are used in automotive vehicles where brake lining or friction material is employed. This application is the continuation in part of application #300,168, filed August 17, 1928.

Brake linings which are largely in use today are composed of very hard material molded or otherwise formed as distinguished from woven brake lining material. In order to have a correct brake adjustment and a nicety of surface to surface fit between the friction surfaces, that is to say—between the brake lining material and the brake drum, very accurate placement and disposition of the brake lining is necessary. This is particularly true with the hard brake linings which have come into use in the last few years. Variations occur in the material constituting the brake shoes, and the brake lining stock itself may vary in thickness. Accordingly, even though a piece of brake lining be very carefully placed upon a brake shoe, the engaging surface may still be irregular so as to not provide an even or uniform surface to surface contact with the brake drum.

The present invention contemplates the provision of a brake truing device for truing the frictional face of the brake lining material. The device is so constructed for so trimming or truing the brake lining while the same is in position on a brake shoe mounted upon the automotive structural parts adjacent the wheel axle or spring. In other words, the brake lining is trued in situ.

In the accompanying drawings:

Fig. 1 is a view illustrating the front axle and the wheel spindle and some of the brake mechanism of an automotive vehicle showing the tool of the present invention in place; the view showing part of the tool in section substantially on line 1—1 of Fig. 2 and showing part of the tool including the cutter element in the position indicated by line 1a—1a of Fig. 2.

Fig. 2 is a view with some parts cut away and some parts in section looking in the direction of the arrows 2—2 of Fig. 1.

Fig. 3 is a view taken substantially on line 3—3 of Fig. 1.

Fig. 4 is a view taken substantially on line 4—4 of Fig. 2.

The front axle of an automotive vehicle is illustrated at 1, the wheel spindle is shown at 2, the back plate of the brake structure is shown at 3, brake shoes at 4, and brake lining attached to the shoes at 5. Some other parts are shown such as a steering arm 6, a tie rod 7 and a brake operating arm 8 swiveled as at 9. These parts are not shown in any particular form as the instrument of the invention may be used with all kinds of vehicles and the parts thus far described, except the brake lining, are subject to any kind of variation insofar as this invention is concerned. The tool of this invention is equally applicable for use on rear wheels where, instead of a wheel spindle, a live axle member projects from the axle housing for carrying the vehicle.

The tool is advisedly of a simple structure and it comprises a central bearing member 10 designed to be swiveled upon a wheel spindle or axle. Inasmuch as the spindles and axles of various automotive vehicles vary in size, the bearing member 10 may be placed on the spindle or axle by means of an adaptor bushing 11, and a suitable number of such adaptor bushings may be on hand to adapt the tool to various vehicles. An adjustable adaptor bushing may be used such as the one disclosed in application Number 436,510, of March 17, 1930. A framelike structure is constituted by a pair of rods 12 which may pass through apertured bosses 13 and the bearing member 10. A set screw 14 may be provided in one or both bosses for maintaining the bearing member in a proper adjusted position with respect to the rods.

An end bracket member 15 may have apertured bosses 16 for receiving the ends of the rods and the end member may be fixed to the rods as by means of set screws 17. The member 15 is provided with a central portion 18 having internal threads, into which a threaded member 19 is fitted, and it may be equipped with a suitable handle 20. The member 19 may carry at one end a head 21 designed to be received in a suitable recess in a boss 22 of the bearing member 10. A washer or plate 23 may be fitted against the boss 22 so as to overlie the head 21 and it may be secured to the member 10 by suitable means such as screws 24. Accordingly, it will be noted that the threaded member 19 may be rotated, and when it is so rotated the bearing member 10 and the frame are shifted relative to each other. This of course preferably is done when the set screw 14 is loosened. A suitable gauge or other indicia device is provided and may take the form of a disk 25 pinned or otherwise fixed to the member 19 to rotate therewith, and this disk has suitable markings, such as for example, the indicia 26 on its periphery. These markings may be used in cooperative relation to a zero indicia or mark 27 on the plate 23.

On the opposite end of the rods 12 there is disposed an electric motor 30, the stator of which may be provided with apertured lugs 31 for receiving the ends of the rods 12, and which may be fixed thereto by set screws 32. This motor may be provided with a knob or handle 33. The shaft of the motor is illustrated at 34, and it is arranged to receive preferably detachably, a cutting or milling instrument 35 having cutting teeth 36 thereon. The milling cutter is designed to project over the brake lining material, as shown in Fig. 1. The motor may be equipped with a switch for controlling the electric current, and the body of such switch is shown at 38 attached directly to the motor and having operating plungers 39 and 40.

This tool may be used in making an initial brake assembly, in the making of a reassembly after the brake shoes have been relined, or in truing worn brake linings where such latter condition may exist.

In the use of the tool the internal diameter of a brake drum may be first determined, and the brake shoe may be adjusted so as to approximate the diameter of the drum. Having determined the internal diameter of the drum, the truing tool may be adjusted to the drum diameter so that the inner cutting edge of the tool 35 is disposed relative to the axis of member 10 a distance substantially equal to the drum radius. This may be accomplished by turning the screw 19 to shift the member 10 in the frame. Once the position is properly attained the set screw 14 may be tightened to hold the position.

The gauging device provided by the indicia on the washer 25 and the zero point 27 on the plate 23 may be employed in varying the position of the cutting tool. The spacing of the markings on the washer 25 may be such as related to the pitch of the screw threads on the member 19 that from one marking to another indicates .001 of an inch. Accordingly, by noting the markings, the cutting tool may be adjusted toward and away from the center a known distance as determined in a small unit such as .001 inch. In making a larger adjustment involving several turns of the member 19, the user should know how many thousandths of an inch are represented by one complete turn, and this may be about a hundred and twenty-five.

The tool may now be journaled on a wheel spindle or axle shaft through the means of a suitable adaptor bushing, and the motor started in operation. The tool may be rocked on the wheel spindle or axle shaft causing the cutting tool 36 to shift over the brake lining material. This action is preferably continued until the entire exposed face of the brake lining has been brought to a true position eliminating all high spots and other irregularities which may be caused by a variation in the thickness of the facing material, or by a variation in the shoe, or for any other reason. The shoe may have to be adjusted during the truing process in order to bring the facing material out sufficiently from the center so that the cutting tool may true everything down to the most exaggerated low spots. Following this, the shoe may be adjusted to provide the requisite clearance which is required between a brake shoe and the brake drum, and the brake lining job is completed save for replacing the wheel and brake drum. The adjusting of the shoe for proper clearances may be carried out by suitable adjusting or gauge tools. It will be appreciated that in some installations the toe and the heel of the brake shoe are adjusted for different clearances as regards the drum, but these are items which are independent of the present invention.

The particular tool 36 shown herein is one of a milling cutter type, and preferably with hard brake linings it is made of high speed tool steel. However, other types of tools may be provided such as sanding or grinding tools such as the stone illustrated in the case above referred to of which this application is a continuation in part.

We claim:

1. A tool for truing brake linings, comprising a hub member adapted to be rotatably supported on a wheel spindle or axle shaft, a pair of parallel rods carried by the hub member, a motor carried by the ends of the rods on one side of the hub member, a rotary cutting tool secured to the motor shaft and adapted to project over the adjacent brake lining material, a bracket connecting the opposite ends of the rods, a shaft screw threaded in the bracket, means connecting the shaft to the hub element whereby the shaft may rotate relative to the hub, and means for rotating the screw threaded shaft.

2. A brake truing tool, comprising a hub element adapted to be rotatably mounted upon a wheel spindle or axle shaft, a pair of opposite apertured lugs on the hub, a pair of rods extending through the lugs and slidable therein, a motor, means attaching the motor to the ends of the rods, a rotary cutting tool connected to the motor shaft and adapted to project over the adjacent brake lining, a bracket connecting the opposite ends of the rods, a screw threaded shaft threaded into the bracket, a handle for turning the same, means rotatably connecting the screw threaded shaft to the hub, and gauging means comprising elements provided with indicia, one fixed to the hub and one fixed to the threaded shaft.

ALVIN L. MILLER.
RUSSELL H. MILLER.